April 18, 1967
J. R. ERWIN ETAL
3,314,649
TURBOMACHINE COOLING SYSTEM
Filed April 15, 1963
2 Sheets-Sheet 1
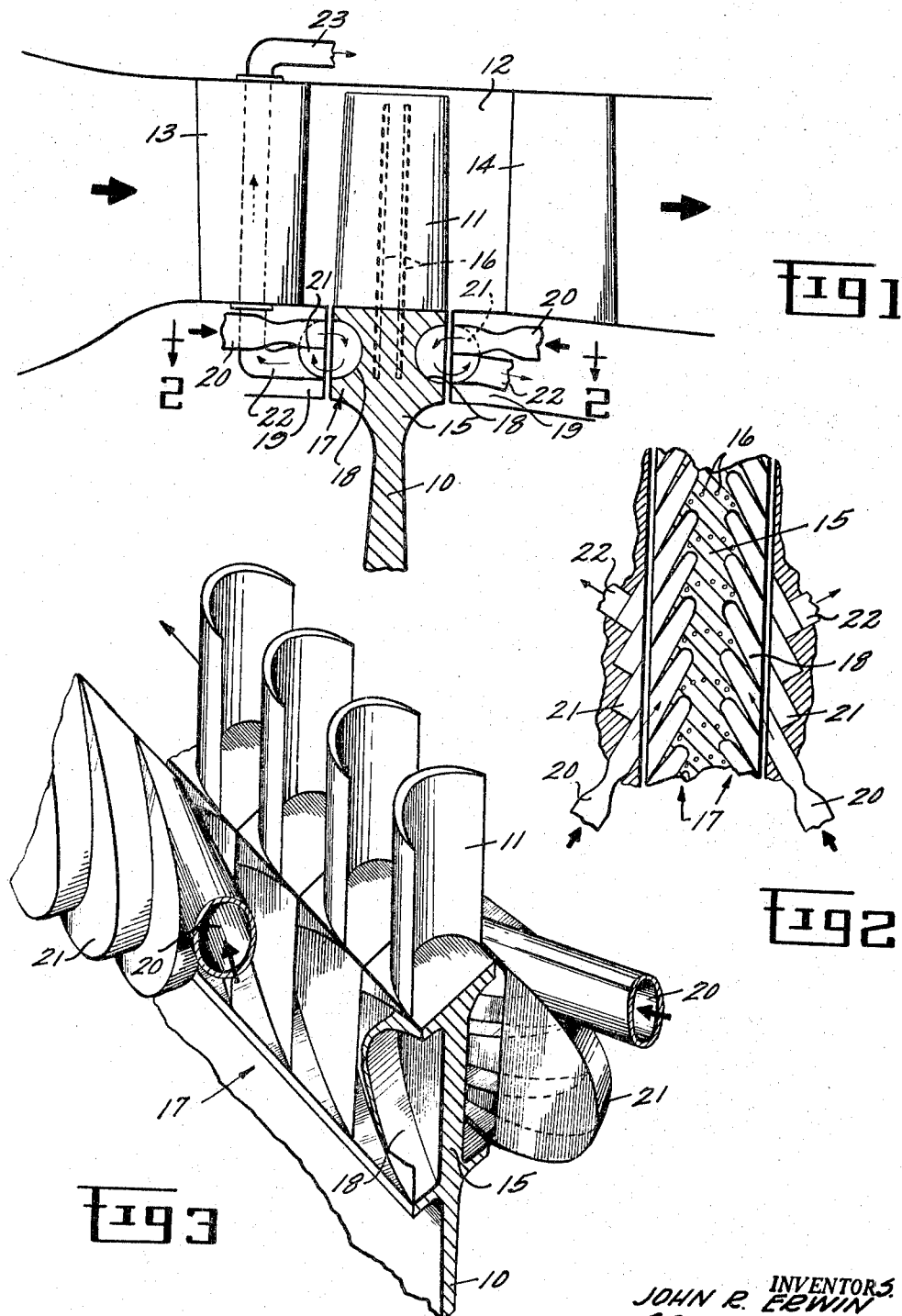
INVENTORS.
JOHN R. ERWIN
BY ARCHIE H. PERUGI
ATTORNEY

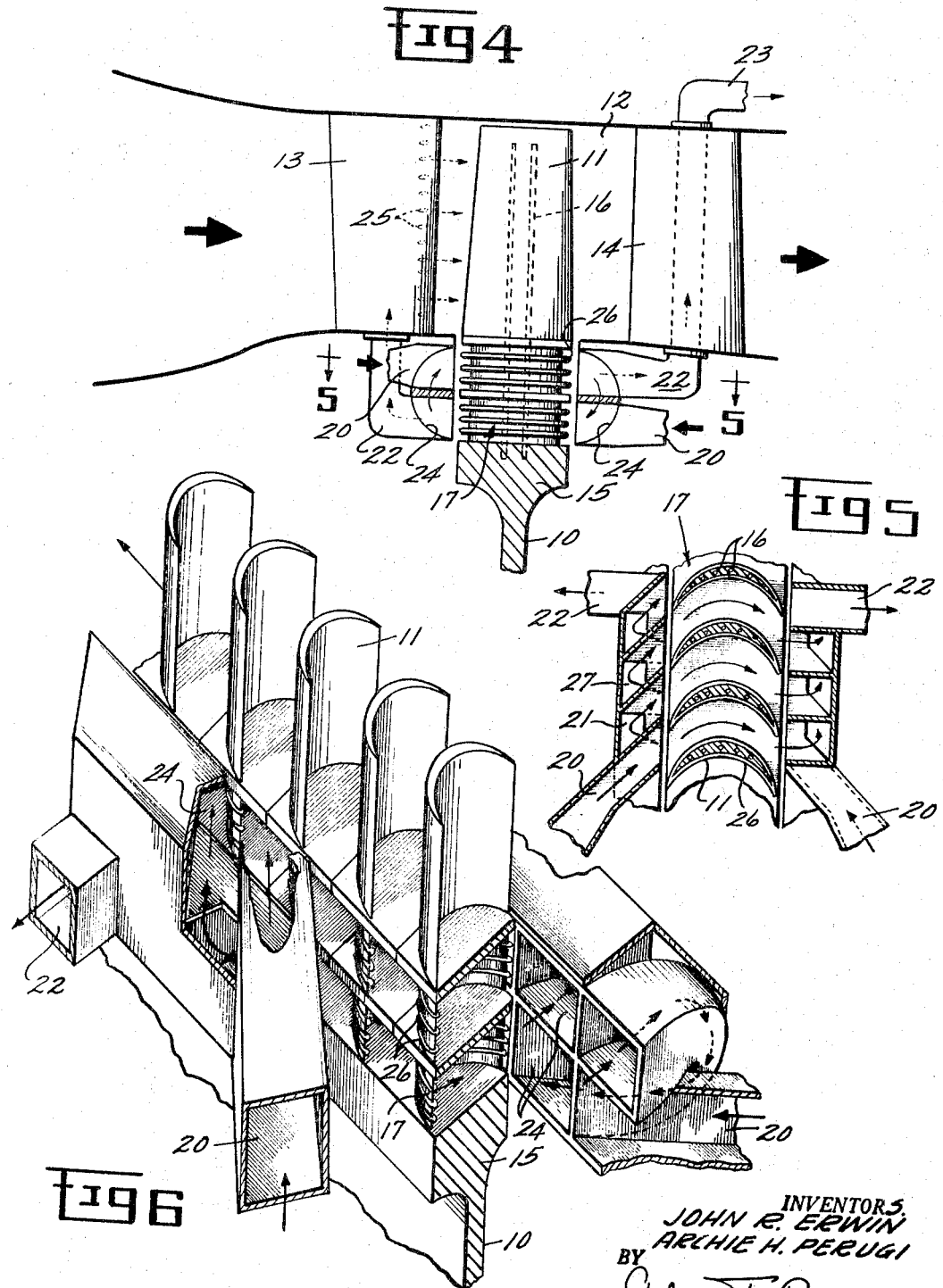

United States Patent Office 3,314,649
Patented Apr. 18, 1967

3,314,649
TURBOMACHINE COOLING SYSTEM
John R. Erwin and Archie H. Perugi, Cincinnati, Ohio, assignors to General Electric Company, a corporation of New York
Filed Apr. 15, 1963, Ser. No. 273,003
10 Claims. (Cl. 253—39.15)

The present invention relates to a turbomachine cooling system and, more particularly, to such a system which employs a refrigeration turbine for both cooling airfoil blades and re-introducing the heat so obtained back into the system.

The problem of cooling engine parts such as turbine rotor blades, turbine nozzles, turbine stators, and other engine and airframe parts becomes difficult at supersonic flight speeds because of the high total temperature of the air with respect to the aircraft. Many schemes and structures have been proposed for the internal cooling of compressor or turbine blades so that the engines may be operated at higher temperatures and at better efficiencies. The basic problem is the difficulty of providing, within the given space of the blades, an air system which is capable of absorbing the extreme amounts of heat required to cool the blades down from very high temperatures. Such high temperatures are encountered at supersonic flight, because of the high combustor temperatures required. However, at high flight speeds the ram air temperature is also high and is higher yet after compression. This thereby limits its ability to absorb heat and restricts its utility as a cooling medium for the turbomachine blading. The cooling air is too hot when taken abroad at these speeds and is inadequate for cooling. It has been proposed to use liquid metal sealed within the blades to form a thermosiphon to conduct heat from the blades to the shank and there remove the heat by passing a relatively cool fluid over the shank. The liquid metal has a very large heat transfer coefficient and, when possible, a large quantity of heat can be removed from the base of the airfoil through various heat exchange devices. Such thermosiphons for liquid metals are known in which the metal is sealed in a tube and boiled as it is subjected to heat. Centrifugal force causes the liquid to flow outward along the walls of the tube and creates a pressure gradient in the tube. The boiling generates vapor whose density is much lower than the liquid. The pressure gradient in the tube forces the vapor down toward the shank to condense in the cool part to create a circulating system. Various structural arrangements of this type of cooling are known and a typical example is illustrated in application Serial Number 240,203 filed November 21, 1962 and assigned to the assignee of the instant invention. Other schemes make use of slots or vanes in the shanks which slots or vanes may be arranged as refrigeration devices to extract heat from the airfoil shank. The difficulty with these devices is the requirement to have a sufficiently cool cooling medium to remove the heat from the liquid metal and have sufficient space to make an effective heat exchanger which will then reject the heat to some other part of the engine. The refrigeration turbine arrangement has the disadvantage of being unable to make effective use of the heat energy picked up in the cooling cycle.

As pointed out, the usual heat sink for any cooling is air that is received from the atmosphere. However, at very high speeds, the air temperatures are quite high and the air is not a good coolant. Nevertheless, it is desirable to use this air as a coolant, since it is the only limitless medium available, and to use it with minimum losses to the system. Thus, in effect, there is required sufficient cooling by a medium that does not have sufficient heat sink capability since it is too hot. Furthermore, it is desired to make use of the energy invested in this hot medium, be it by compression or by high temperature due to ram effect. Compression represents work put in and the ram effect has been paid for at the cost of drag on the aircraft.

The main object of the present invention is to provide a turbomachine cooling system which uses a hot fluid for cooling and re-invests the energy in the system.

Another object is to provide such a cooling system which extracts energy from the cooling fluid, for example air taken abroad by an inlet, and turns it into useful work.

A further object is to provide such a system that is self-contained in a single airfoil such as may be used in a turbine or compressor.

A further object is to provide a cooling system wherein the hot fluid is cooled by means of a recycling turbine in the shank of the airfoil, and the cooled fluid is then used as a heat sink to absorb more heat from the airfoil and then, in turn, has this heat extracted and returned to the system as shaft work.

Briefly stated, the invention provides a turbomachine cooling system which is substantially included in each single airfoil blade preferably on a single disk. Each blade has a shank portion out of the path of the hot gas turbine working fluid over the blade and separate therefrom. Multi-turbine blade means are disposed on the shank portion and a casing surrounds the shank portion and has means, such as nozzles, to direct a separate second fluid through the turbine blade means on the shank and recycle the second fluid through the turbine blade means at least once. This arrangement cools the second fluid by extracting shaft work therefrom by the turbine, which cool fluid is then used as a heat sink to absorb more heat from the blades and, by recycling, the absorbed heat is then again extracted by the turbine means to drive the turbine rotor so that a minimum amount of energy is lost to the system and effective cooling is obtained from a fluid that was originally too high in temperature to act as an effective heat sink.

While the specification concludes with claims particularly pointing out and distinctly claiming the subject matter which is regarded as the invention, it is believed the invention will be better understood from the following description taken in connection with the accompanying drawing in which:

FIG. 1 is a partial diagrammatic showing of a cooling system employing a Terry-type turbine on each side of the rotor disk in the shank portion of the airfoil blade;

FIG. 2 is a partial diagrammatic showing taken on line 2—2 of FIG. 1 illustrating the recycling feature;

FIG. 3 is a partial perspective view of the structure employed;

FIG. 4 is a view similar to FIG. 1 showing a modified or different form of turbine shank structure;

FIG. 5 is a view similar to FIG. 2 showing diagrammatically the recycling arrangement of FIG. 4, and FIG. 6 is a partial perspective view illustrating the structure employed in FIGS. 4 and 5 and the aligned extension of the airfoil blade.

Referring first to FIG. 1, there is shown a diagrammatic arrangement of the cooling system of the instant invention in a typical application. This comprises a rotor disk 10 which may be a single disk as shown and which disk has preferably separate airfoil blades 11 peripherally arranged thereon. Blades 11 may be compressor blades or turbine buckets and, for purposes of description herein, will be described as turbine buckets. Turbine buckets 11 are disposed in duct means 12 in the usual manner which duct means is for passing hot fluid, shown by the arrow, over buckets 11 to extract energy therefrom to drive disk 10. The buckets 11 are preceded by nozzle partition or diaphragm 13 and followed by the usual struts or stator vanes 14. It is to be understood that the main hot fluid passing over buckets 11 is coming from an upstream combustor as is well known in the art. In the case of compressor blades 11 the hot air from upstream may be mere ram air which is at a high temperature because of its high velocity.

Buckets 11 are secured to disk 10 by the usual shank portion 15 which may be formed with the well known firtree arrangement or any other suitable fastening means.

In order to remove the heat picked up from the hot gas stream in duct 12 each individual turbine bucket 11 is supplied with a multiplicity of internal sealed thermosiphons of which two are generally indicated at 16. This may consist of sealed tubes of liquids and preferably a liquid metal that boils and vaporizes in a known way to conduct heat to the shank portion 15. The structure thus far described is well known in the prior art.

In order to effectively cool the buckets 11 and do this with a too hot fluid and still recover energy, the invented system proposes the use of turbine blade means generally indicated at 17 in each shank portion of each bucket separate from and out of the path of the main hot fluid in duct 12. This can consist of the well known Terry-type turbine, better shown in FIGURE 3, and consisting of individual spiral path buckets 18 on the side of rotor disk 10 in the shank portion 15. For recycling purposes a casing 19 surrounds and is disposed adjacent the shank portion and the casing is supplied with nozzle means 20 to direct hot fluid through buckets 18 where the fluid is recycled by redirecting it through the nozzles in the casing to return the flow as shown in FIGURES 2 and 3 to be expanded through a second nozzle 21 and through buckets 18 and as many additional nozzles as the system is designed for in order to extract the heat energy in a second fluid introduced through nozzle 20. This second fluid may be a hot fluid such as ram air at a high temperature or may be air that has been extracted from an upstream compressor section and may have been used for cooling elsewhere. It is important to note that with the return flow structure there is the recycling of the second fluid through the turbine buckets 18 since it is this feature which permits substantial energy extraction and return to the system as shaft work as will now be explained. After a suitable recycling by returning the flow through the shank turbine, the second fluid may then be directed by a suitable conduit 22 through nozzle partition 13 for cooling purposes for any other engine element. It may then be exhausted as diagrammatically shown through conduit 23 where it may be introduced to the engine exhaust nozzle downstream (not shown) thus re-introducing the fluid into the system as additional mass.

Additionally, an identical turbine system may be provided on the opposite side of the rotor disk so that the same second fluid is introduced on both sides of the rotor disk and exits on the same side it enters and energy is extracted by two sets of turbines. In either case, returning the flow by the structure described in the casing provides for recycling through the turbine bucket or blade means 18 at least once or, in other words, two or more passes are required.

The benefits of the instant cooling system are obtained by the conservation of energy in the fluids and the re-introduction of this energy into the system as shaft work. The hot gas in duct means 12 imparts heat to bucket 11 which then must be cooled. The thermalsiphon 16 is the heat sink for the heat absorbed by bucket 11 and conducts this heat to shank portion 15 and this is a continuous cycle permitting the thermosiphon to continuously remove heat from bucket 11. The turbine buckets in the shank portion 15 are designed to extract heat as shaft work from the incoming hot second fluid from nozzle 20 and by such work extraction the fluid from nozzle 20 is cooled. Thus, turbine 17 extracts energy from the second hot fluid entering at 20 and does useful work in driving rotor disk 10. This then, is in the form of useful shaft work to the system. Additionally, the second hot fluid from 20 is thus cooled by the work in the form of heat removed by the bucket and this enables it then to act on the return flow or next pass as a heat sink for removing heat directed to the shank portion by thermalsiphon 16 in which case the fluid again becomes hot. This hot fluid, by then recycling it through the return flow structure in the casing by means of another expanding nozzle 21 and then passing it again through the shank turbine, has this heat energy extracted by the turbine and put into rotor disk 10. Thus, by proper design, the maximum amount of energy can be extracted from the second fluid introduced in nozzle 20. This fluid is then passed internally through nozzle 13 or any other suitable engine element and, when possible, re-introduced into the system so that whatever remaining energy and mass it has is not lost. Furthermore, the heat energy from the main gas stream, that is transferred to bucket 11 is transferred by the thermosiphon 16 to the second fluid, after the second fluid has been cooled by passing through turbine blade means 17, so that this investment of energy also is not lost. Thus, the recycling reduces the temperature of the second fluid and does it by giving energy to the rotor disk 10. Further, the remaining fluid may be re-introduced into the system to provide mass in a turbojet powerplant or have its complete useful energy extracted by disk 10 to provide shaft horsepower in a turboshaft engine.

Referring next to FIGURE 4, a modified form of turbine is shown and like numerals are used to refer to like parts. In this system, when 11 is considered as a turbine bucket, the shank portion 15 is an aligned extension of bucket 11 to form a turbine in the shank. If 11 is a compressor blade, then shank portion 15 is an extension of the compressor blade. This aligned extension of the turbine bucket 11 permits reduced loading and twisting forces on the bucket as a whole since the shank portion is merely an extension of the upper bucket with additional fins as will be explained. This modification introduces the second fluid through nozzle 20 as previously explained in connection with FIGURE 1, and passes it completely through a turbine portion, such as the upper part shown, of the shank portion to a reversing chamber 24 preferably in the casing on the opposite side of disk 10. Reversing chamber 24 then returns the flow as a nozzle in the sense that it redirects the fluid back through another turbine part, such as the lower part shown, of the shank portion 15 and does this at least once after which it may be disposed of through conduit 22 as previously indicated to re-introduce it through apertures 25 into the main stream or it may be passed through stator vanes 14 or, as in FIGURE 1, through diaphragm 13 to be re-introduced downstream wherever the pressure is suitable. In either case it performs a cooling function on elements 13 and 14 or any other through which it is directed. For additional heat extraction, and as better seen in FIGURE 6, fins 26 are provided longitudinally in the direction of flow of the second fluid through the turbine blade or bucket. It is to be noted that as many stages as necessary may be employed in the recycling of the second fluid and expansion through nozzles 20. This is seen in FIGURE 5 where a second nozzle 21 and even a third nozzle 27 and more may be used. As previously, the second fluid, which may be ram air or fluid from a compressor upstream, before or after it has been used for cooling elsewhere, is introduced through nozzle 20 and expanded therein. Turbine 17, in the extended portion in shank 15, by extracting shaft work from the second fluid entering nozzle 20 thus cools this fluid. The cooled fluid which, by the reversing chamber 24 in the casing, is then returned through the lower part of the turbine, is then enabled to absorb more heat from the thermosiphon 16 which hotter fluid then, by the recycling feature, has its heat energy removed again by the shank turbine and put into rotor disk 10 in the form of work and this returning of the flow or recycling may be repeated as often as necessary until the maximum energy has been extracted. The remaining cooled fluid is then used to cool nozzle 13 and re-introduced into the main stream through apertures 25 or passed downstream or through stator 14 or both. Thus, the heat energy lost by the main stream into bucket 11 is transferred to the second hot stream entering nozzle 20 and is then extracted by the turbine in shank 15 to drive disk 10. The redirecting or recycling of the fluid by the directing means in the casing to return the flow permits this repeating heat absorption and cooling and putting work into disk 10.

As previously stated, it will be apparent that buckets 11 may be compressor blades in which case both FIGURE 1 and FIGURE 4 merely represent inlets and the hot fluid entering would be at high temperature from the ram effect or upstream compressor blades.

While there have been described preferred forms of the invention, obviously modifications and variations are possible in light of the above teachings. It is therefore to be understood that within the scope of the appended claims, the invention may be practiced otherwise than as specifically described.

We claim:
1. A turbomachine cooling system comprising,
a single rotor disk having airfoil blades peripherally disposed thereon,
duct means for passing a hot fluid over said blades,
a shank portion on each airfoil blade disposed out of the path of and separated from said hot fluid,
turbine blade means in each shank portion,
a casing surrounding and disposed adjacent said shank portion,
means in said casing directing a second fluid through said turbine blade means,
said means including return flow structure in said casing for said second fluid,
said return flow structure redirecting said second fluid toward said turbine blade means to recycle the second fluid through said turbine blade means at least once.

2. Apparatus as described in claim 1 wherein the airfoil blades are turbine blades and each shank portion turbine is an aligned extension of its airfoil turbine blade.

3. Apparatus as described in claim 1 wherein the airfoil blades are compressor blades and each shank turbine blade means is an extension of its airfoil compressor blade.

4. Apparatus as described in claim 1 wherein the turbine blade means is provided in the shank on each side of the rotor disk and the means directing the second fluid is directed at both sides of said shank so the second fluid enters and exits the turbine blades on the same side of the disk.

5. Apparatus as described in claim 2 wherein the shank portion turbine is provided with fins aligned in the direction of flow of said second fluid through said turbine blade means.

6. A turbomachine cooling system comprising,
a single rotor disk having airfoil blades peripherally disposed thereon,
duct means for passing a hot fluid over said blades,
a shank portion on each airfoil blade disposed out of the path of and separated from said hot fluid,
multi-turbine blade means in each shank portion,
a casing surrounding and disposed adjacent said shank portion,
a plurality of peripherally arranged expanding nozzles in said casing directed at said blade means,
means in said casing connected to and supplying a second fluid to said nozzles to be expanded and directed through said turbine blade means,
said means including return flow structure in said casing for said second fluid,
said return flow structure redirecting said second fluid through an adjacent turbine blade means in the same shank portion so the second fluid is recycled through the multi-turbine blade means in each shank portion at least once,
liquid sealed cooling means in each airfoil blade to form a thermosiphon and conduct heat to the shank portion,
whereby heat is extracted from said second fluid by said turbine blades which cooled fluid then absorbs heat from said shank portion and the heat is then again extracted by the adjacent turbine from the recycled second fluid and heat energy from both the fluid and shank is thus converted to shaft work.

7. Apparatus as described in claim 6 wherein the airfoil blades are turbine blades and each shank portion turbine is an aligned extension of its airfoil turbine blade.

8. Apparatus as described in claim 6 wherein the multi-turbine blade means is provided in each side of the shank portion and the expanding nozzles are provided in the casing on each side of said disk so the second fluid is directed at both sides of said shank to be recycled through the turbine on each side and exit on the same side.

9. Apparatus as described in claim 6 wherein the airfoil blades are compressor blades and each shank turbine blade means is an extension of its airfoil compressor blade.

10. Apparatus as described in claim 7 wherein the shank portion turbine is provided with fins aligned in the direction of flow of said second fluid through said turbine blade means.

References Cited by the Examiner

UNITED STATES PATENTS

| | | | |
|---|---|---|---|
| 1,851,513 | 3/1932 | Holmstrom | 230—122 |
| 2,501,038 | 3/1950 | Fransson | 253—39.15 |
| 2,524,549 | 10/1950 | Theimer | 253—39.1 |
| 2,640,319 | 6/1953 | Wislicenus | 253—39.1 |
| 2,973,937 | 3/1961 | Wolf | 253—39.15 |

MARTIN P. SCHWADRON, *Primary Examiner.*

SAMUEL W. ENGLE, *Examiner.*